Figure 3:
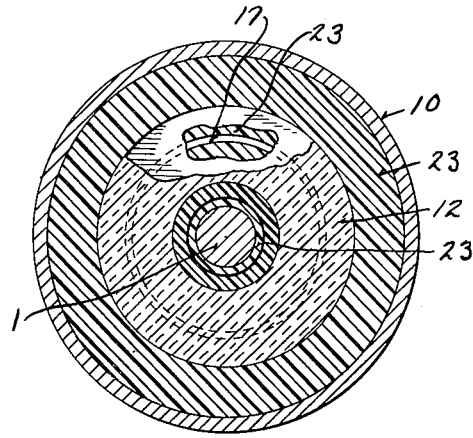

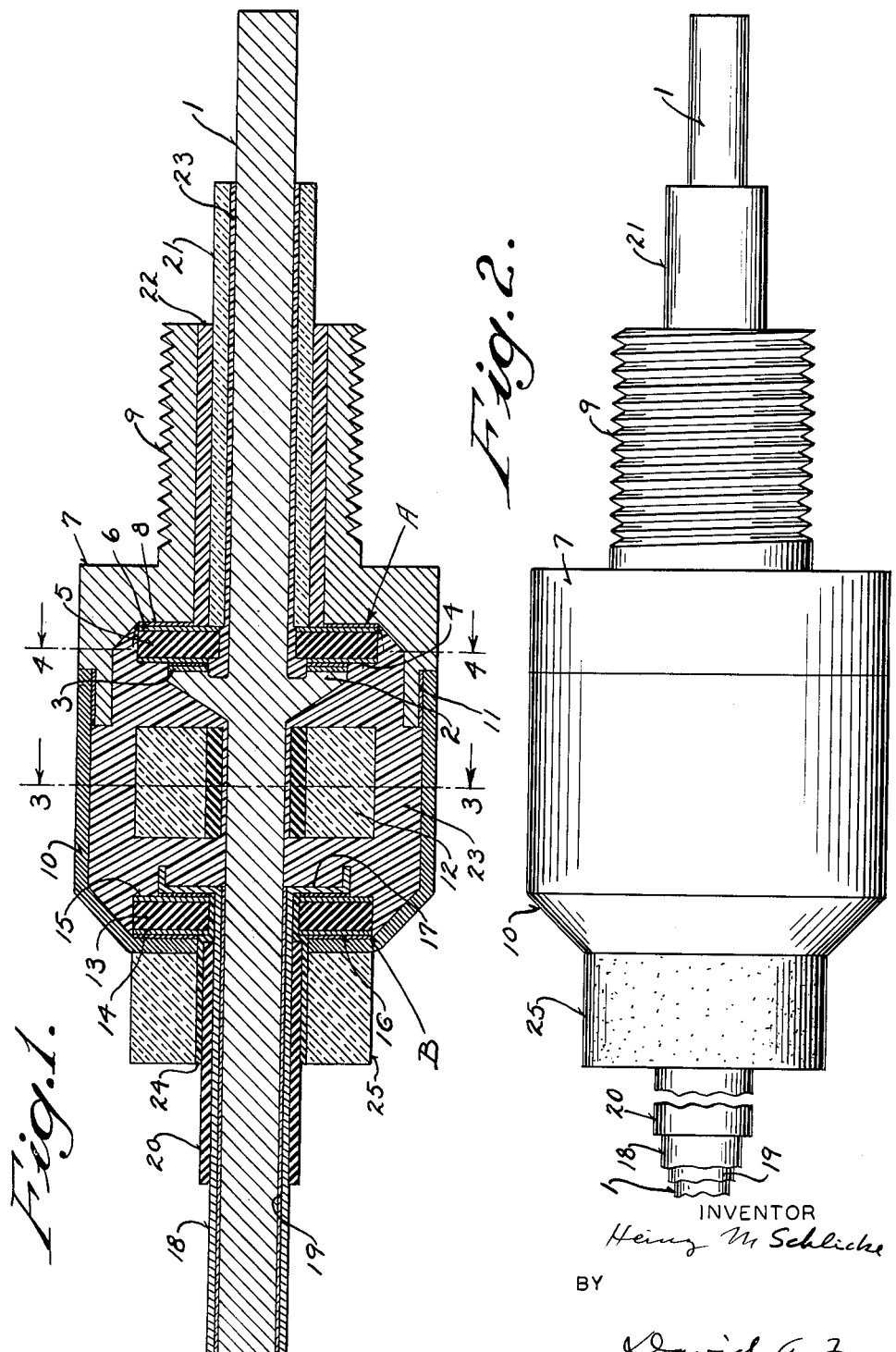

Feb. 27, 1962 H. M. SCHLICKE 3,023,383
FEED-THROUGH CAPACITOR
Filed May 28, 1956 3 Sheets-Sheet 2

INVENTOR
Heinz M. Schlicke
BY
David A. Fox
ATTORNEY

Feb. 27, 1962    H. M. SCHLICKE    3,023,383
FEED-THROUGH CAPACITOR
Filed May 28, 1956    3 Sheets-Sheet 3

Frequency In Megacycles

INVENTOR
Henry M. Schlicke
BY
David E. Fox
ATTORNEY

United States Patent Office 3,023,383
Patented Feb. 27, 1962

3,023,383
FEED-THROUGH CAPACITOR
Heinz M. Schlicke, Fox Point, Wis., assignor to Allen-Bradley Company, Milwaukee, Wis., a corporation of Wisconsin
Filed May 28, 1956, Ser. No. 587,692
2 Claims. (Cl. 333—79)

This invention relates to filters capable of diverting or attenuating electrical waves of frequencies in the neighborhood of several hundred million cycles per second upwards to and above a thousand million cycles per second and it resides in a structure which will perform the function required without breakdown under substantial voltages and without harmful parallel resonance properties within the range of frequencies to be diverted; said structure comprising successive, mechanically cascaded, ceramic dielectric capacitors, electrically joined in parallel by an external conductor connected with one electrode of each capacitor, an internal feed-through conductor connected with the other electrode of each capacitor and with bodies of high permeativity polycrystalline ceramic material interposed between the successive capacitors and surrounding the feed-through conductor.

So-called feed-through capacitors, used mainly in connection with ultra high frequency equipment to provide a selective or preferred path for the electromagnetic waves between a conductor passing through a shielding wall and such wall, using ceramic dielectrics such as the titanates are known but in the forms heretofore available the voltages which they would tolerate have been limited. For certain purposes, feed-through capacitors capable of withstanding higher voltages (upwards of 5,000 volts) are required as, for example, in the case of certain electromagnetic ranging devices. This requirement necessitates ceramic dielectric elements proportionately thicker and to regain the attendant loss of capacity a proportionate increase in the active area of the dielectric and of the electrodes is required. If such dimensional changes are made, the parallel resonance frequency is often brought into the midst of the frequency range which is sought to be diverted. The same difficulty is encountered even though voltages are lower where a large capacity is required for any reason and a filter, effective over a wide frequency range, is desired.

By dividing the capacitor into a plurality of smaller units the difficulties, detailed above, are not avoided even if the capacitors are placed side by side which would call for an awkward arrangement. If the separate capacitors are placed in line, one above the other, surrounding a central feed-through conductor (in multiple mechanical cascade) and parallel connection is made between the capacitors and an external conductor, an acceptably compact structure results but the coupling inductance between the capacitor elements creates a resonance frequency situation which renders such a construction useless in the frequency ranges in which this invention is useful.

In accordance with the present invention, a multiple, mechanically cascaded construction is employed having a plurality of capacitor elements connected to surrounding or adjacent a feed-through conductor but the coupling inductance between the capacitor elements is loaded by bodies of high permeability polycrystalline ceramic to greatly reduce the resonance frequency or to dampen resonance.

An object of this invention therefore is to provide a feed-through capacitor construction which will withstand higher voltages or to have large capacity, which will at the same time be compact and which will be free of resonance effects which would otherwise materially impair the filtering properties of the apparatus.

The above and other objects and advantages of this invention will appear from the description following which is set forth with reference made to the accompanying drawing in which there is set forth by way of illustration and not of limitation one form in which the apparatus of this invention may be embodied.

Figure 4:
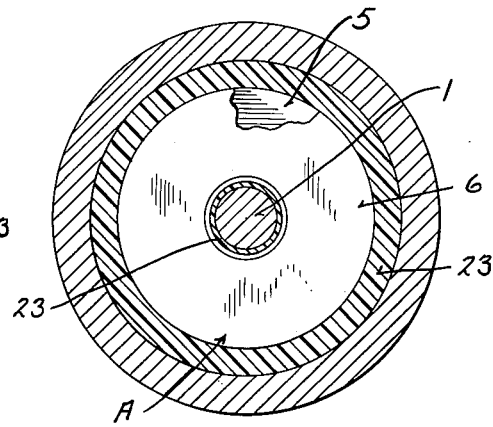
Figure 5:
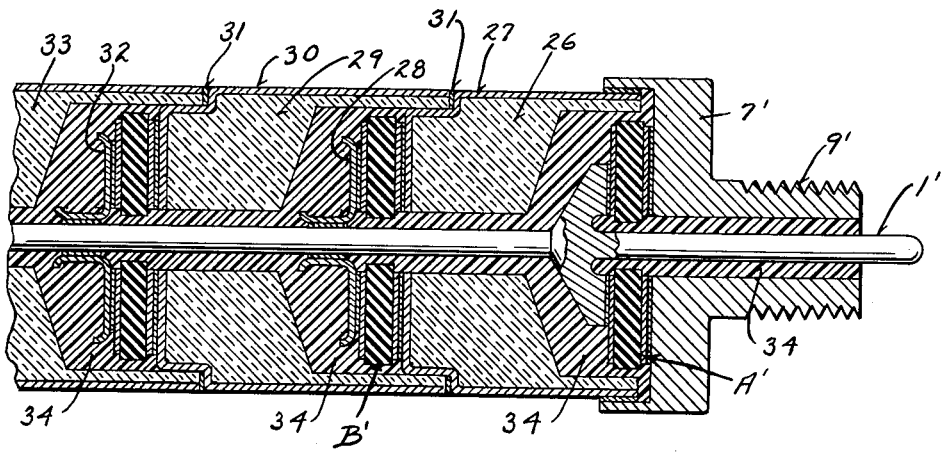
Figure 6:
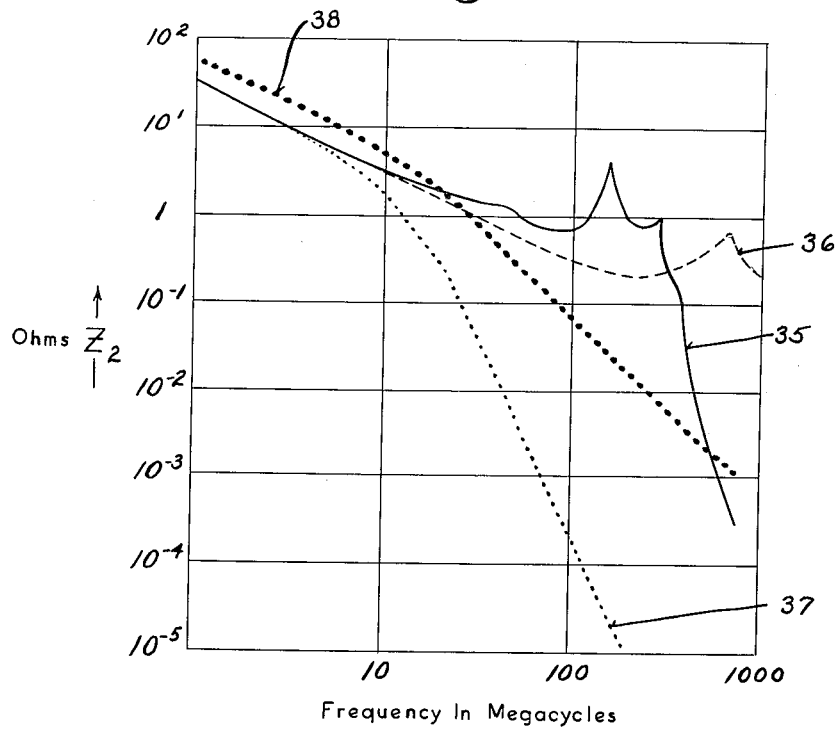
Figure 7:
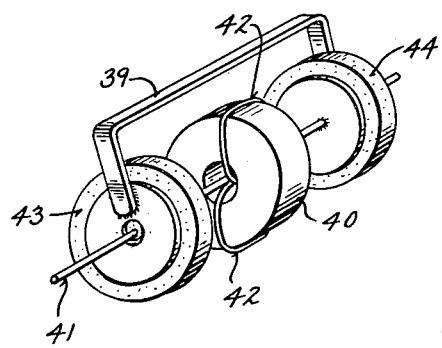

In the drawings:

FIG. 1 is a side view in elevation and in section of one form of the feed-through capacitor of this invention, FIG. 2 is a side view in elevation, partly broken away, of said feed-through capacitor, FIG. 3 is an end view in elevation and in section with parts broken away of said feed-through capacitor viewed through the plane indicated at 3—3 in FIG. 1, FIG. 4 is an end view in elevation and in section with parts broken away of said feed-through capacitor, viewed through the plane 4—4 indicated in FIG. 1, FIG. 5 is a side view in elevation and in section of another form of the feed-through capacitor of the invention in which more than two capacitors are employed, FIG. 6 is a graph showing the performance of units constructed in accordance with this invention as compared with performance of less satisfactory character, and FIG. 7 is a modified form of the invention utilizing the principles thereof to form a filter unit.

As appears in FIGS. 1 through 4, a feed-through capacitor may be constructed in accordance with this invention in a form employing a central conductor 1 made of copper or other suitable material which is upset centrally to provide a collar 2. In facing engagement with the collar 2 and mechanically and electrically joined therewith by a solder film 3 is a first capacitor unit A made up of a dielectric body 5, an electrode plate 4, and a facing electrode plate 6. The dielectric body 5 may be formed of so-called titanate ceramic substances such as barium titanate, magnesium titanate or other similar polycrystalline ceramic material having a high dielectric constant.

The electrode plates 4 and 6 preferably are formed of metal intimately bonded to the body 5 such as may be provided by firing paste silver in place. The electrode plate 6 is mechanically and electrically joined with a metallic mounting sleeve 7 by a solder film 8. The sleeve 7, in turn, is provided with a threaded shank 9 intended to be received in an opening provided therefor in a shielding enclosure.

In a suitable shoulder provided therefor at the enlarged rim of the sleeve 7 is seated a metallic shell 10 electrically and mechanically joined with the sleeve 7 by the solder film 11. Within the shell 10 and surrounding the central conductor 1 is an annular body 12 composed primarily, or in major part, of so-called high permeability polycrystalline ceramic material. Such materials are well-known, are commonly referred to as ferrites and are prepared at high temperatures from oxides of iron and of certain other divalent or polyvalent metals. Such materials will, hereinafter, be referred to as ferrites.

The ferrite body 12 in surrounding the conductor 1 is interlinked with the magnetic field thereof so that losses occur in the body 12 at frequencies at and above those where domain wall or gyromagnetic resonances occur. At several hundred million cycles and upward such resonances become pronounced in ferrites, thus causing a high insertion loss. The dielectric body 4 of the first capacitor unit A, because of its thickness, (that is sufficient to withstand several thousand volts) is of less capacity than a thinner body of the same area and this capacity must be supplemented to accomplish the filtering function desired.

To provide the additional capacity without undesirable resonance effects due to coupling, a second capacitor unit B is enclosed within the shell 10 but on the opposite side of the body 12. The capacitor unit B comprises a titanate or high dielectric-constant ceramic body 13 and its electrode plates 14 and 15. The plate 14 is connected through a solder film 16 with shell 10 and the plate 15 with the flange 17 of a metal quill 18 which is united with conductor 1 by a solder film 19. Insulating sleeves 20 and 21 help position the parts while sealing composition at 22, 23 and 24 preempts voids which might otherwise hold moisture.

Surrounding conductor 1 to the left of the shell 10, is a second annular body of ferrite 25 which contributes to the dissipation obtainable by reason of the losses occurring therein. The capacitor units proper, A and B, are thus cascaded mechanically, each contributes electrically, but because of the intermediate ferrite body 12, whose effect on account of losses is predominantly resistive, inductive coupling effects are avoided and undesirable resonance is dampened.

The importance of effective cascading of the capacitor units A and B, with inductive coupling effects suppressed, may be recognized even more readily where the number of cascaded units is increased above two.

The required dimensions of the elements used in apparatus of this invention are subject to design calculations as are other electrical components. To illustrate, it may be shown analytically that stacking of $n$ discoidal feed-through capacitors results in $(n-1)$ poles of an effective coupling impedance. Four ¼" dielectric discs each having a capacity of about 1300 pf., were assembled in mechanical and electrical cascade without ferrite material. The spacing was 0.020 inch to accommodate the thickness of the disc plus about 0.065 inch for electrodes and insulation. The relative dielectric constant of the ceramic was 6000. In FIG. 6, curve 35 represents the measured values of the impedance of the assembly, confirming analytically predicted results. The measured curve does not show infinite impedance at the poles as theory would suggest because of dielectric losses, but the position of the poles may be shown in this way to be subject to calculation.

Curve 36 represents a single discoidal feed-through capacitor of about ½" diameter having a capacity of the same order of magnitude, namely, 5700 pf. The latter has its parallel resonance at 680 mc.

It may be seen from this, that parallel resonances are as much a shortcoming of large discoidal feed-through capacitors as they are of stacked smaller discs of higher parallel resonance frequency.

A single small disc capacitor of 1300 pf. used for the assembly from which curve 35 was measured has a parallel resonance at about 1800 mc. Thus, the splitting-up introduces unavoidable coupling inductances which, though extremely small, bring about undesirably low coupling resonances.

The introducing of ideal, that is, lossless ferrites, in form of interspaced washers or beads would only change the frequency scale of curve 35, provided the permeability of the ferrite would remain constant with changes in frequency. The inductance would be increased and the peaks would be shifted to lower frequencies. However, in the frequency ranges above about one megacycle, certain ferrites, as previously noted, are far from being ideal due to domain wall and gyromagnetic resonances.

The behavior of a series of cascaded feed-through capacitors with interspaced ferrite washers constructed in accordance with this invention is dependent on this property of ferrites and such structures produce results of the nature illustrated in curve 37 in FIG. 6. The dimensions of the ferrite washers used in the particular assembly subjected to this measurement were, length 38 cm.; outside diameter .75 cm.; and inside diameter .2 cm. Curve 37 was obtained with washers of ferrite having its $Q=1$ point at about 1 mc.p.s. The dielectric discs were the same as those used in preparing curve 36.

The coupling resonances are thus shown to be damped very effectively by the ferrite. Curve 37 is slightly shifted to the right compared with results which might have been secured with slightly larger ferrite washers. The measurements thus made fully confirm that the ferrite behaves predominantly ohmically in the frequency range where coupling resonances can exist.

The curve 37 in FIG. 6 was obtained from an assembly designed on the premise of ideal capacitors in the structure. However, the tremendous transforming effect of the ferrite washers permits, in practice, the use of large dielectric discs that have their parallel resonances in the operating frequency range. Thereby, large capacity values can be achieved, noticeably improving the performance at very high frequencies. Stacked units employing 1" diameter dielectric discs of 12,000 pf. each have been used.

Where but two units are stacked as in FIGS. 1 to 4, the capacitance transformation is less than it is in structures where the assembly contains four units as treated in curve 37. Nevertheless, assemblies including but two units are quite effective. Curve 38, for example, illustrates the results obtainable from a two unit assembly.

An instance of a multiple construction including more than two capacitors appears in FIG. 5, wherein the feed-through filter is shown as including a central conductor 1' upon which the parts are assembled. A tubular metallic mounting 7' having a threaded shank 9' is secured to a first capacitor unit A' in the manner previously described. The capacitor unit A' is secured in turn to an upset collar 2' formed as a part of the conductor 1'. Surrounding capacitor unit A' is an annular ferrite member 26 having a metalizing coating 27 thereon extending along the side surface and over the end.

The second cell or unit of the cascaded system includes a second capacitor unit B' secured to the metalized coating 27 at the end of body 26 as shown. The opposite side of capacitor unit B' is joined through metal disc 28 with conductor 1'. The second cell also includes a surrounding annular ferrite member or body 29 carrying a metalized coating 30 similar to the body 26 and coating 27. The coatings 27 and 30 are joined electrically at 31 by a solder film which aids in maintaining the parts in rigid alignment.

The third cell includes a capacitor C' joined with the coating 30 and the disc 32 and surrounded by the ferrite body 33. If the capacitor C is part of the terminal cell a metalizing coating for body 33 may be omitted.

Additional cells may be included to any number desired by introducing units such as are represented by capacitor C' and the body 29 to which it is attached. As in constructions previously described voids occurring between the parts may be filled with insulating spacers or insulating sealing compound 34 or both. It is to be understood also that when desired, adjacent contacting metallic parts may be electrically and mechanically joined by an interposed solder film.

As may be observed in FIGS. 1 and 2 and in FIG. 5, the intervening ferrite body or bodies is or are entirely surrounded, except for the entrance and exit openings for the main conductor, by a metallic conductive shell or sleeve. There is thus physical symmetry in a transverse section and such has been assumed in the design analyses above referred to. It is apparent, however, that this coaxial symmetry may be interrupted by omitting part of the coaxial shell so that the conductor in effect runs along one side only of the ferrite body. Such a construction is shown in FIG. 7 where the shell becomes physically, in such a case, an electrically conducting bracket 39 along the side of the ferrite body 40 connecting the two capacitors 43 and 44. A side bracket conductor, such as 39, may introduce certain inductance effects producing local resonance conditions of a magnitude and frequency which may, occasionally, be employed to produce desirable alterations in the behavior of a filter.

If desired, the main conductor 41 may be formed as a toroidal winding having one or more turns 42—42 interlinking the rim of the ferrite body or washer. In such a case the series resonance frequency is maintained by the external conductor 39 along one side only of the ferrite body and since the impedance of the decoupling ferrite is increased by the winding, the filter effect is increased proportionately. It has been found, however, that more than three turns in the winding on the ferrite introduces difficulties since the winding capacitance itself is effective to shunt the toroid if a greater number is used. If the metallic conducting shell 39 is complete and symmetrical, even three turns may be found to be excessive since the shell itself contributes to capacity.

Where multiple turns are employed, consideration must be given to the reduction in filtering which may occur due to biasing effects exerted by the main current carried through the conductor. This is particularly aggravated where the main current is a direct current but alternating current of commercial power frequency may be nearly as harmful. If a single turn only is employed, up to five amperes of main current does not noticeably decrease the filtering performance with a suitable ferrite.

If the cut-off frequency must be lowered below that at which the filters of this invention are effective, ordinary filter chokes may be added. The parallel resonance of such chokes can be easily arranged to fall below 20 mc.p.s., thus providing high insertion losses at low frequency without having to take their ineffectiveness at higher frequency into account.

I claim:

1. A unitary, mechanically cascaded, parallel electrically connected feed-through capacitor unit for application in a high frequency range where inductive reactance in the line leading to and lying between the cascaded capacitors and magnetic coupling between said line and the aforesaid capacitors tends to produce filter phenomenon comprising; a main circuit feed-through conducting member; a lateral conducting member for connection to a shielding enclosure to be entered by said main circuit feed-through conducting member; a plurality of spaced capacitor units spaced along said main circuit conducting member each having a frequency of dimensional resonance above the frequency range of application and an outer peripheral surface parallel to the axially extending surfaces of the lateral conducting member, said capacitor units being disposed between said feed-through conducting member and said lateral conducting member, in shunt electrical connection therewith; first and second flanged rings of a ferrite material having domain wall and gyromagnetic resonance losses in said frequency range of application, the first ring surrounding a portion of said feed-through conducting member and having its flange surrounding substantially the entire outer peripheral surface of one of the capacitor units, between the latter surface and said lateral conducting member, said ring being electrically interposed between the electrical connection to adjacent capacitor units, and the second ring surrounding a portion of the feed-through conducting member adjacent another capacitor unit and having its flanged portion surrounding the entire outer peripheral surface of said other capacitor unit, each of said ferrite rings being adapted to introduce through magnetic loss a substantial insertion loss and damping effect in the surrounded portion of the main circuit feed-through conducting member and to shield the capacitor units from magnetic coupling to adjacent portions of the feed-through conducting member.

2. A unitary, mechanically cascaded, parallel electrically connected feed-through capacitor unit for application in a high frequency range where inductive reactance in the portions of the line leading to and lying between adjacent cascaded capacitors and magnetic coupling between said line portions and the capacitors tends to produce filter phenomenon comprising; a conducting base; a substantially straight axially disposed main conducting member adjacent said base and insulated therefrom; a first capacitor unit adjacent said base having one electrode connected thereto and the other electrode connected to said main conducting member; an annular ring shaped ferrite body adjacent said first capacitor unit and surrounding a portion of said main conducting member, said ferrite body having a flange portion substantially completely surrounding the outer periphery of said first capacitor and being adapted to introduce losses in high frequency currents traveling on said conducting member and to shield said capacitor, thereby minimizing inductive coupling between said capacitor and the adjacent portion of the conducting member; a second capacitor unit on the side of said ferrite body opposite said first capacitor unit, said second capacitor having electrical connections to said base and to said main conducting member, each of the aforesaid capacitors having a frequency of dimensional resonance above the frequency range of application; and a second annular shaped ferrite body adjacent said second capacitor unit on the side opposite the first ferrite body, said second ferrite body having a flange portion completely surrounding the outer periphery of said second capacitor, whereby said capacitor is shielded from magnetic coupling to said main conducting member by said first and second ferrite bodies.

References Cited in the file of this patent

UNITED STATES PATENTS

| | | |
|---|---|---|
| 2,594,890 | Ellwood | Apr. 29, 1952 |
| 2,756,375 | Peck | July 24, 1956 |
| 2,759,155 | Hackenberg | Aug. 14, 1956 |
| 2,776,411 | Anderson | Jan. 1, 1957 |
| 2,782,381 | Dyke | Feb. 19, 1957 |
| 2,784,382 | Harris | Mar. 5, 1957 |

FOREIGN PATENTS

| | | |
|---|---|---|
| 227,714 | Switzerland | Sept. 16, 1943 |
| 538,175 | Belgium | May 31, 1955 |

OTHER REFERENCES

Beljers: Physica, vol. 14, No. 10, February 1949, pages 629–641.

Fidelman: Radio-Electronic Engineering, April 1954, pages 30–32, 68, 69.

Reggia: Radio-Electronics Engineering, April 1953, vol. 20, No. 4, pages 12–14 and 24.